Patented Oct. 5, 1926.

1,602,004

UNITED STATES PATENT OFFICE.

ALEXANDER P. ELIADES, OF WASHINGTON, DISTRICT OF COLUMBIA.

METHOD OF OBTAINING SCALP-TREATING OILS.

No Drawing. Original application filed November 13, 1923, Serial No. 674,530. Divided and this application filed June 26, 1924. Serial No. 722,542.

This invention relates to the production of vegetable oils, and more particularly to oils obtained from butternuts; its object being the preparation of a butternut oil which is peculiarly suitable for use in the treatment of the scalp as a stimulant and invigorator of the hair and as a corrective and preventative for dandruff and other diseased conditions.

The invention further relates to the production of a scalp-treating oil of the above character in a pure state, and capable of maintaining such state for a long period without becoming rancid or turbid.

In carrying out my invention, I preferably proceed as follows: The butternuts are first shelled and the pieces of shell then removed, although small fragments which may happen to remain do not appear to exert any injurious influence on the final product. The nut meats are then soaked in salt water of approximately saturated solution strength, for several hours, preferably two, to facilitate the subsequent extraction of the oil and to wash off any dirt. Next, the nuts are drained and placed in an oven and heated therein until they have become a rich brown color, after which they are placed in a suitable chopper and reduced to a fine pulp. This roasting step is of considerable importance because the thorough cooking and drying to which the meats are thus subjected has the effect of preventing any subsequent tendency toward rancidity or turbidity in the final product. About five pounds of this roasted and reduced nut pulp are then placed in a copper cooking kettle, together with a quart of previously extracted butter nut oil and sufficient boiling water to prevent scorching during the initial stages of the heating. The mixture is then heated to boiling, and maintained at this temperature, with frequent stirring, until the water has been removed.

The cooked pulp is then poured into an oil-extracting press of any desired and suitable type, after the added oil and oil extracted during the cooking process has been drained therefrom, and compressed until all of the oil has been extracted. A bag type of press is preferred, in order to hold back the solid particles of the pulp. The oil thus obtained is filtered through a fine-mesh filter sack, and is then bottled ready for use.

The product thus obtained is a limpid, golden yellow liquid which is practically odorless, or has a very faint "roasted nut" aroma. It keeps for a long time without becoming rancid or turbid.

No claims for the product are made in the present case, however, as such claims are comprised in my prior application No. 674,530, filed November 13, 1923, of which the present case is a division.

I claim:

1. The method of extracting butternut oil from butternuts which comprises first soaking the whole nutmeats in brine, then draining off the brine and roasting the whole meats until they attain a rich brown color, then comminuting the meats, adding a quantity of previously extracted butternut oil and water and cooking to a pulp the mixture at the boiling temperature thereof, draining the free oil from the cooked pulp, and pressing the residual oil from the latter.

2. The method of extracting oil from butternuts, which comprises a preliminary soaking treatment of the nuts in a salt solution, subsequent roasting the nuts, subsequent comminution of the nuts, subsequent cooking of the comminuted nuts with water and previously extracted butternut oil to form a pulp, and the subsequent pressing of oil from the pulp.

3. The method of extracting oil from butternuts, which comprises first soaking the nuts in a saline solution, then roasting the nuts, then comminuting the nut meats, then cooking the comminuted meats in water and previously extracted butternut oil to drive off volatile matter therefrom and subsequently pressing the oil from the cooked pulp.

4. The method of extracting oil from butternuts, which comprises first soaking the nutmeats in brine, then draining off the brine and roasting the meats until they attain a rich brown color, then comminuting the meats, cooking to a pulp with water and previously extracted butternut oil at the boiling temperature of the oil, and pressing the oil from the cooked pulp.

In testimony whereof I affix my signature.

ALEXANDER P. ELIADES.